J. E. KEPPEL.
VALVE.
APPLICATION FILED FEB. 17, 1916.

1,234,907.

Patented July 31, 1917.

Inventor:
Jesse E. Keppel,
By Bruce S. Elliott
his Atty.

UNITED STATES PATENT OFFICE.

JESSE E. KEPPEL, OF ST. LOUIS, MISSOURI, ASSIGNOR TO VULCAN VALVE COMPANY, OF ST. LOUIS, MISSOURI, A CORPORATION OF MISSOURI.

VALVE.

1,234,907.

Specification of Letters Patent.  Patented July 31, 1917.

Application filed February 17, 1916. Serial No. 78,818.

*To all whom it may concern:*

Be it known that I, JESSE E. KEPPEL, a citizen of the United States, residing in the city of St. Louis and State of Missouri, have invented new and useful Improvements in Valves, of which the following is a specification.

This invention relates to fluid pressure valves, and has special reference to an improved valve for use in connection with pneumatic tires of vehicles.

Valves as now generally used in this connection are, relatively speaking, quite complicated and it is therefore one of the principal objects of my invention to provide a valve which shall be characterized by extreme simplicity in construction. A further object of the invention is to provide a valve of the character indicated which shall be sensitive and reliable in operation, and, as an incident to its simple construction, one which will not be liable to get out of order, and which will therefore have the maximum life.

The invention is illustrated in the accompanying drawing, in which—

Figure 1:
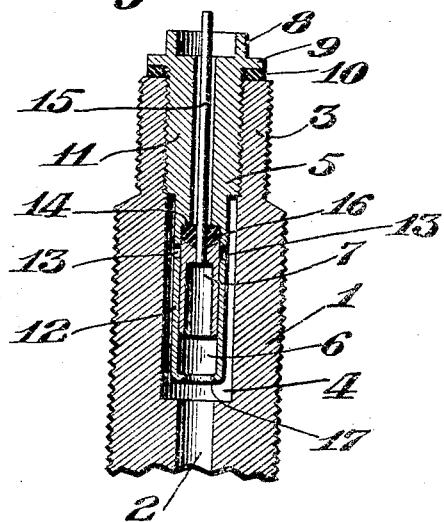
Figure 1 is a longitudinal sectional view through my improved valve and the casing inclosing the same.
Figure 2:
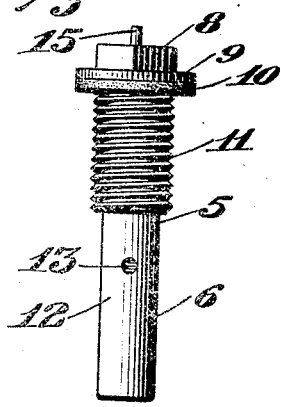
Fig. 2 is a view in elevation of the valve removed from the casing.
Figure 3:
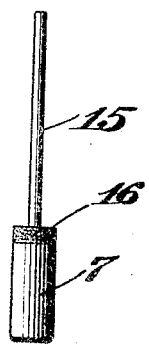
Fig. 3 is a view of the valve member and its stem.

Referring now to the drawing, the numeral 1 indicates the valve casing, which is of a well-known type. The valve casing is provided with a longitudinal air duct 2, and at its upper end with a reduced portion 3, which is exteriorly and interiorly screw-threaded. At its upper portion below the reduced end 3 the air duct is enlarged to provide a chamber 4 for receiving the valve 5, comprising a valve-shell 6, and a valve-member 7. The valve-shell is tubular in form, and at its upper end is provided with a non-circular portion 8, and below said non-circular portion with a shoulder 9 which forms a seat for a gasket 10, which may be of rubber, fiber, leather, or other suitable material. Below the shoulder 9 the valve-shell is provided with a screw-threaded portion 11, and below the screw-threaded portion with a reduced cylindrical portion 12, which is provided intermediate its length with a series of apertures 13, opening into the annular space around the cylindrical portion within the enlarged valve chamber 4. At a suitable distance above the apertures 13 a valve-seat 14 is provided upon which emerges the inner end of an inlet air duct $5^a$, the same being located on the interior of the cylindrical portion 12. The valve-member 7 is in the form of a hollow cylindrical piston, closed at its upper end and open at its lower end, its upper end having secured thereto one end of a valve-stem 15, which passes through duct $5^a$ to the outer end of the shell. Surrounding said valve-stem and lying on the upper end of the valve-member 7 is a rubber gasket 16 in the form of a relatively deep cushion which is adapted, in operation, to be forced by the pressure of the air in the tire against the valve-seat 14 and prevent egress of air from the tire. The valve-member 7 is of such a length that when its upper end is seated against the valve-seat 14 it will then extend past the apertures 13 and close them, and is of a diameter to snugly fit as a substantially air-tight piston in the interior of the cylindrical portion 12 while free to move therein. In placing the valve in the casing 1 a suitable key may be applied to the non-circular portion 8 for the purpose of screwing the screw-threaded portion 11 into engagement with the interior threads of the end portion 3; and when screwed down to bring the gasket 10 into contact with the upper end of said reduced portion, the cylindrical portion 12 of said valve will be housed in the chamber 4, which chamber is of such size as to permit the ready escape of air, in inflating the tire, through the apertures 13, and past the lower end of the valve-member into the air duct 2.

In the inflating operation the valve-member 7 will be unseated by the pressure of the inflating air flowing in through the inflation duct $5^a$ and its upper end will be forced below the apertures 13 to permit the passage of the air through said apertures and the air duct 2 into the tire. As soon as the pressure of inflation ceases the pressure of the air on the interior of the tire will force the valve-member upward to bring the gasket 16 into contact with the valve-seat 14, and also to cause the body of the valve-member to close the apertures 13, the latter being practically a sealing connection; and as the valve-member fits the bore of the cylindrical portion 12 sufficiently close to provide also practically a sealing connection, there can be no direct passage of the air from the tire around the sides of the valve member, especially at the seat portion thereof, which might tend to balance the pressure of air on the valve and permit it to readily unseat. The valve member and the cylindrical guide portion of the shell coöperate to form an air pocket which is open on its lower end, and this pocket partially confines the air so as to effect the closing movement of the valve member by the back pressure. As indicated in Fig. 1 the valve member does not extend up on the side of the gasket cushion, that is to say, the side of the cushion is left uncovered so that it lies adjacent to the inner face of the cylindrical guide wall. The valve-member 7 being hollow and open at its lower end, the air from the tire enters said valve and the back pressure of said air is therefore more effective in closing the valve securely than would be the case if the valve-member were solid and the pressure of the air were exerted on the end thereof. In further explanation of this construction, it may be stated that as with the hollow valve-member the pressure of the air is largely exerted at the closed upper end of the bore adjacent to the valve seat, and simultaneously on the side walls of the bore, the valve-member will tend to move in a right line directly to its seat without binding, and to seat true, whereas, where the back pressure is exerted solely on the end of the valve-member, there would be some likelihood of the valve-member, especially after continued use, being canted by the air pressure from a movement in a right line and of not seating squarely against the valve-seat 14.

The end face of the gasket 16 comes directly against the valve seat 14. The side face of the gasket is cylindrical and lies adjacent to the inner face of the cylindrical portion 12. I am aware that tapered conical gaskets have been employed in valves of this kind but it is evident that such a gasket is a compressible cushion and when it comes upon a conical seat there is a tendency for the gasket to move deeply into the seat, the action being somewhat the same as that of a cork or stopper in a bottle; that is to say, such a valve tends to stick on its seat and will not open with the same freedom as a valve having the features described. At the same time, it is evident that in my valve the cylindrical side face lies close to the wall of the cylindrical guide for the valve and consequently under the action of the air pressure on the interior of the tire, my valve gasket will operate as an effective plug, but as soon as the pressure is relieved it does not hinder the free opening of the valve.

In order to prevent the valve-member from dropping or being forced out of the lower end of the cylindrical portion 12, I preferably turn in slightly the lower edge portion of said cylindrical portion, as indicated at 17. This part then operates as a stop to limit the opening movement of the valve member 7.

While I have shown the upper end of the valve as being provided with a non-circular or squared portion 8, I wish it understood that any suitable means other than that shown may be provided to enable the valve to be screwed into the casing. I might mention the obvious expedient of a slot, such as is provided in the head of an ordinary screw, permitting the device to be screwed home by a screw-driver. It is not deemed necessary, however, to illustrate this latter or any equivalent means for enabling the valve to be turned by a suitable implement.

It will be understood, of course, that the stem 15 is for the purpose of unseating the valve-member to deflate the tire when necessary, and that a suitable cap will be screwed on the reduced portion 3 to cover the end of the valve casing.

As shown in Fig. 1, when the valve is closed the side face of the gasket 16 lies against the wall of the shell, and it is obvious that the pressure on the back of the valve will tend to compress the gasket and spread it laterally so that it operates effectively, not only to act as a closure at the seat 14, but also acts as a seal at the circumferential face of the gasket.

I claim:

1. In a valve mechanism of the class described, the combination of a removably mounted shell having an interior valve seat with a duct emerging upon said seat, and having a cylindrical portion provided with apertures adjacent said seat, a cylindrical valve member mounted to slide as a substantially air-tight piston in said cylindrical portion to close said apertures when on said seat, and operating to move to and uncover said apertures when the valve opens, said shell being open at its inner portion to expose said valve-member to the back pressure to enable the back pressure to move the valve-member onto its seat and make an air-tight closure at said seat, and a valve casing having an enlarged valve chamber to receive said cylindrical portion and form an annular space thereabout with which said apertures communicate, said shell having means for engaging said valve member to retain the same.

2. In a valve-mechanism of the class described, the combination of a valve-shell having a single valve-seat with a duct therethrough, said shell having a circumferentially continuous cylindrical guide wall with apertures therethrough adjacent said seat, a cylindrical valve member open at its lower end mounted to slide in, and guided by said cylindrical portion, a gasket in the form of a compressible cushion with a cylindrical side face, and mounted on the end of said valve member, to engage said seat with the end face of said gasket, said gasket lying between said apertures and said seat when the valve is in its closed position, and a valve casing having an air duct and an enlarged valve chamber communicating therewith to receive said cylindrical portion and forming an annular space thereabout with which said apertures communicate, said valve member and said cylindrical guide portion coöperating to form an air pocket open below and operating to partially confine air under said valve to effect the closing movement of said valve member by the back pressure, the said cylindrical side face of said cushion being uncovered and lying adjacent to the inner face of said guide wall.

3. In a valve mechanism of the class described, the combination of a valve shell having a valve seat with a duct therethrough, said shell having cylindrical guide walls with apertures therethrough adjacent said seat, a cylindrical valve member mounted to slide in, and guided by said cylindrical portion, a gasket in the form of a compressible cushion with a cylindrical side face, and mounted on the end of said valve member to engage said seat with the end face of said gasket, said gasket lying between said apertures and said seat when the valve is in its closed position, said valve movable to an open position to uncover said apertures, and a valve casing having an enlarged valve chamber to receive said cylindrical portion and forming an annular space thereabout with which said apertures communicate, the said cylindrical side face of said cushion being uncovered and lying against the inner face of said guide wall when the valve is in its closed position.

In testimony whereof, I have hereunto set my hand.

JESSE E. KEPPEL.